US010131391B2

(12) United States Patent
Shirai

(10) Patent No.: US 10,131,391 B2
(45) Date of Patent: Nov. 20, 2018

(54) BICYCLE SEATPOST ASSEMBLY

(71) Applicant: SHIMANO INC., Sakai (JP)

(72) Inventor: Toyota Shirai, Sakai (JP)

(73) Assignee: SHIMANO INC., Sakai (JP)

( * ) Notice: Subject to any disclaimer, the term of this patent is extended or adjusted under 35 U.S.C. 154(b) by 9 days.

(21) Appl. No.: 15/164,799

(22) Filed: May 25, 2016

(65) Prior Publication Data
US 2017/0341692 A1 Nov. 30, 2017

(51) Int. Cl.
B62J 1/08 (2006.01)
B62K 19/36 (2006.01)
F16F 9/06 (2006.01)

(52) U.S. Cl.
CPC .......... B62J 1/08 (2013.01); B62K 19/36 (2013.01); B62J 2001/085 (2013.01)

(58) Field of Classification Search
CPC ... F16F 9/462; F16F 9/06; B62K 19/36; B62J 2001/085; B62J 1/08
USPC .......................................................... 188/269
See application file for complete search history.

(56) References Cited

U.S. PATENT DOCUMENTS

| | | | | |
|---|---|---|---|---|
| 5,133,529 A * | 7/1992 | Kashima | ................. | B63B 29/04 248/162.1 |
| 6,270,065 B1 * | 8/2001 | Hals | ........................... | B62J 1/04 267/132 |
| 8,328,454 B2 * | 12/2012 | McAndrews | .............. | B62J 1/08 297/215.13 |
| 8,881,875 B2 * | 11/2014 | Buma | ..................... | F16F 9/006 188/268 |
| 8,894,025 B2 * | 11/2014 | Wehage | ..................... | B62J 1/06 248/157 |
| 8,926,216 B2 * | 1/2015 | McAndrews | .............. | B62J 1/08 403/109.7 |
| 9,688,331 B1 * | 6/2017 | Shirai | ........................ | B62J 1/08 |
| 2004/0070168 A1 * | 4/2004 | McKinnon | ............. | B62K 19/36 280/281.1 |
| 2007/0057420 A1 * | 3/2007 | Jordan | ................... | B62K 25/08 267/64.26 |
| 2007/0262501 A1 * | 11/2007 | Cheever | ................. | B62K 25/08 267/64.11 |
| 2011/0187166 A1 * | 8/2011 | Walsh | ........................ | B62J 1/06 297/215.13 |
| 2012/0098175 A1 * | 4/2012 | Wu | ........................... | B62J 1/08 267/132 |

(Continued)

Primary Examiner — Bradley T King
Assistant Examiner — James K Hsiao
(74) Attorney, Agent, or Firm — Mori & Ward, LLP

(57) ABSTRACT

A bicycle seatpost assembly comprises a first tube, a second tube, and a positioning structure. The second tube has a distal end to be attached to a bicycle seat and a proximal end opposite to the distal end. The second tube is configured to be telescopically received in the first tube. The positioning structure is configured to position the first tube and the second tube relative to each other. The positioning structure comprises a fluid chamber. The fluid chamber comprises a first chamber, a second chamber, and a movable piston. The first chamber is filled with a first liquid. The second chamber includes a second liquid and gas. The second chamber is disposed closer to the distal end of the second tube than the first chamber. The movable piston divides the fluid chamber into the first chamber and the second chamber. The movable piston is movable within the fluid chamber.

15 Claims, 6 Drawing Sheets

(56) References Cited

U.S. PATENT DOCUMENTS

| | | | |
|---|---|---|---|
| 2012/0247894 A1* | 10/2012 | Shirai | F16F 9/462 188/322.13 |
| 2013/0093231 A1* | 4/2013 | Hsu | B62J 1/08 297/344.19 |
| 2013/0119634 A1* | 5/2013 | Camp | B62J 1/08 280/287 |
| 2013/0221713 A1* | 8/2013 | Pelot | B62J 1/02 297/215.13 |
| 2015/0232142 A1* | 8/2015 | Shirai | B62J 1/08 403/104 |
| 2015/0276007 A1* | 10/2015 | Talavasek | B62K 25/20 188/269 |
| 2016/0075204 A1* | 3/2016 | Marking | F16F 9/062 267/225 |
| 2016/0236739 A1* | 8/2016 | Shirai | B62J 1/08 |
| 2016/0355225 A1* | 12/2016 | Shirai | B62J 1/06 |
| 2017/0096185 A1* | 4/2017 | Hara | B62J 1/08 |
| 2017/0197680 A1* | 7/2017 | Feng | B62J 1/08 |

* cited by examiner

BICYCLE SEATPOST ASSEMBLY

BACKGROUND OF THE INVENTION

Field of the Invention

The present invention relates to a bicycle seatpost assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle seatpost assembly.

SUMMARY OF THE INVENTION

In accordance with a first aspect of the present invention, a bicycle seatpost assembly comprises a first tube, a second tube, and a positioning structure. The second tube has a distal end to be attached to a bicycle seat and a proximal end opposite to the distal end. The second tube is configured to be telescopically received in the first tube. The positioning structure is configured to position the first tube and the second tube relative to each other. The positioning structure comprises a fluid chamber. The fluid chamber comprises a first chamber, a second chamber, and a movable piston. The first chamber is filled with a first liquid. The second chamber includes a second liquid and gas. The second chamber is disposed closer to the distal end of the second tube than the first chamber. The movable piston divides the fluid chamber into the first chamber and the second chamber. The movable piston is movable within the fluid chamber.

With the bicycle seatpost assembly according to the first aspect, it is possible to reduce or prevent an intrusion of the gas into the first chamber. The first and second liquids are incompressible, whereas the gas is compressible. Thus, in a case where a lot of gas intrudes into the first chamber, the bicycle seat may become unstable even after the relative position of the first and second tubes is stabilized by the positioning structure. Accordingly, with the bicycle seatpost assembly according to the first aspect, the bicycle seat can be stable after the relative position of the first and second tubes is stabilized by the positioning structure. In addition, the second liquid enhances slidability of the movable piston. Accordingly, durability of the movable piston is enhanced.

In accordance with a second aspect of the present invention, the bicycle seatpost assembly according to the first aspect is configured so that the second liquid is provided to be closer to the movable piston than the gas in a state where the first tube is mounted to a bicycle frame that is in an upright position.

With the bicycle seatpost assembly according to the second aspect, it is possible for the second liquid to obstruct a gap between the movable piston and an inner wall of the fluid chamber in a state where the first tube is mounted to the bicycle frame that is in an upright position. Accordingly, it is possible to further reduce or prevent an intrusion of the gas into the first chamber. Therefore, the bicycle seat can be further stable after the relative position of the first and second tubes is stabilized by the positioning structure.

In accordance with a third aspect of the present invention, the bicycle seatpost assembly according to the first aspect is configured so that the fluid chamber is provided in the second tube.

With the bicycle seatpost assembly according to the third aspect, it is possible to design the second tube such that an outer diameter of the second tube is larger and a maximum overall length of the bicycle seatpost assembly is longer compared to a bicycle seatpost assembly in which a fluid chamber thereof is provided in the first tube thereof.

In accordance with a fourth aspect of the present invention, the bicycle seatpost assembly according to the second aspect is configured so that the fluid chamber is provided in the second tube.

With the bicycle seatpost assembly according to the fourth aspect, it is possible for the second liquid to obstruct a gap between the movable piston and an inner wall of the fluid chamber in a state where the first tube is mounted to the bicycle frame that is in an upright position. Accordingly, it is possible to further reduce or prevent an intrusion of the gas into the first chamber. Therefore, the bicycle seat can be further stable after the relative position of the first and second tubes is stabilized by the positioning structure. In addition, it is possible to design the second tube such that an outer diameter of the second tube is larger and a maximum overall length of the bicycle seatpost assembly is longer compared to a bicycle seatpost assembly in which a fluid chamber thereof is provided in the first tube thereof.

In accordance with a fifth aspect of the present invention, the bicycle seatpost assembly according to any one of the above aspects is configured so that the second liquid includes an oil.

With the bicycle seatpost assembly according to the fifth aspect, the oil does not freeze in a typical environment where the bicycle seatpost assembly is used. In addition, the second liquid hardly rust material of the second tube.

In accordance with a sixth aspect of the present invention, the bicycle seatpost assembly according to any one of the above aspects is configured so that the first liquid has a first viscosity. The second liquid has a second viscosity that is larger than the first viscosity.

With the bicycle seatpost assembly according to the sixth aspect, the second liquid tends not to leak out of the second chamber even when a pressure difference between the first chamber and the second chamber becomes large. Thus, it is possible for the second liquid to obstruct a gap between the movable piston and an inner wall of the fluid chamber for a long time. Accordingly, durability of the bicycle seatpost assembly is enhanced.

In accordance with a seventh aspect of the present invention, the bicycle seatpost assembly according to any one of the above aspects is configured so that the second liquid has a kinematic viscosity more than or equal to 300 centistokes at 40 degrees Celsius.

With the bicycle seatpost assembly according to the seventh aspect, the second liquid has the kinematic viscosity enough not to leak out of the second chamber even when a pressure difference between the first chamber and the second chamber becomes large. Thus, it is possible for the second liquid to obstruct a gap between the movable piston and an inner wall of the fluid chamber for a further long time. Accordingly, durability of the bicycle seatpost assembly is further enhanced.

In accordance with an eighth aspect of the present invention, the bicycle seatpost assembly according to any one of the above aspects is configured so that the second liquid has a kinematic viscosity less than or equal to 1000 centistokes at 40 degrees Celsius.

With the bicycle seatpost assembly according to the eighth aspect, the second liquid has the kinematic viscosity enough to stay at the bottom of the second chamber even when the movable piston moves rapidly. Thus, it is possible for the second liquid to obstruct a gap between the movable piston and an inner wall of the fluid chamber for a long time. Accordingly, it is possible to further reduce or prevent an intrusion of the gas into the first chamber. Therefore, the bicycle seat can be further stable after the relative position of the first and second tubes is stabilized by the positioning structure. In addition, the second liquid does not impede movement of the movable piston while the positioning structure is operated by a user. Accordingly, operability of the bicycle seatpost assembly is enhanced.

In accordance with a ninth aspect of the present invention, the bicycle seatpost assembly according to the eighth aspect is configured so that the second liquid has a kinematic viscosity less than or equal to 400 centistokes at 40 degrees Celsius.

With the bicycle seatpost assembly according to the ninth aspect, followability of the second liquid with respect to movement of the movable piston is further enhanced. Thus, the movable piston can move further smoothly while the positioning structure is operated by a user. Therefore, operability of the bicycle seatpost assembly is further enhanced. Further, in a case where a kinematic viscosity of the second liquid is from 300 centistokes to 400 centistokes at 40 degrees Celsius, the followability of the second liquid remains high in a long-term use as well as leakage of the second liquid out of the second chamber is prevented in a long-term use. Accordingly, durability of the bicycle seatpost assembly is further enhanced.

In accordance with a tenth aspect of the present invention, the bicycle seatpost assembly according to any one of the above aspects is configured so that the gas in the second chamber has a first volume in a state where the distal end of the second tube is positioned farthest from the first tube. The gas in the second chamber has a second volume in a state where the distal end of the second tube is positioned closest to the first tube. A compression ratio defined as the first volume divided by the second volume is less than or equal to 2.0.

With the bicycle seatpost assembly according to the tenth aspect, a pressure in the second chamber cannot become extremely high enough for the second liquid to leak out of the second chamber when the gas is most compressed. Accordingly, durability of the bicycle seatpost assembly is further enhanced.

In accordance with an eleventh aspect of the present invention, the bicycle seatpost assembly according to the tenth aspect is configured so that the compression ratio is more than 1.0 and less than or equal to 1.5.

With the bicycle seatpost assembly according to the eleventh aspect, the second liquid is further prevented from leaking out of the second chamber when the gas is most compressed, because a pressure in the second chamber when the gas is most compressed becomes lower than that in the bicycle seatpost assembly according to the tenth aspect. Accordingly, durability of the bicycle seatpost assembly is further enhanced.

In accordance with a twelfth aspect of the present invention, the bicycle seatpost assembly according to any one of the above aspects is configured so that the movable piston is a floating piston.

With the bicycle seatpost assembly according to the twelfth aspect, a pressure in the first chamber can be transmitted to the second chamber via the movable piston to compress the second chamber. The movable piston can sealingly divide the first chamber and the second chamber and change relationship of volume between the first chamber and the second chamber.

In accordance with a thirteenth aspect of the present invention, the bicycle seatpost assembly according to any one of the above aspects is configured so that the movable piston comprises a movable member and a first seal. The movable member has a circumference. The first seal is provided on the circumference and contacts the fluid chamber.

With the bicycle seatpost assembly according to the thirteenth aspect, the first seal prevents the second liquid from leaking out of the second chamber. Accordingly, durability of the bicycle seatpost assembly is further enhanced.

In accordance with a fourteenth aspect of the present invention, the bicycle seatpost assembly according to the thirteenth aspect is configured so that the first seal is an elastic member having an annular shape.

With the bicycle seatpost assembly according to the fourteenth aspect, the first seal is a commodity. Accordingly, manufacturing cost of the bicycle seatpost assembly can be reduced.

In accordance with a fifteenth aspect of the present invention, the bicycle seatpost assembly according to the thirteenth or fourteenth aspect is configured so that the movable member is movable in a first direction in which the first chamber and the second chamber are aligned. The movable piston further comprises a second seal provided on the circumference and contacting the fluid chamber. The first seal and the second seal are disposed along the first direction.

With the bicycle seatpost assembly according to the fifteenth aspect, the first and second seals further prevent the second liquid from leaking out of the second chamber. Accordingly, durability of the bicycle seatpost assembly is further enhanced.

In accordance with a sixteenth aspect of the present invention, the bicycle seatpost assembly according to any one of the above aspects is configured so that the bicycle seatpost assembly is to be attached to a bicycle frame.

With the bicycle seatpost assembly according to the sixteenth aspect, the bicycle seatpost assembly is useful for driving a bicycle, because a rider of the bicycle can raise or lower the bicycle seat without pulling up or pushing down the bicycle seat with the rider's hand. Accordingly, the operability of the bicycle is enhanced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
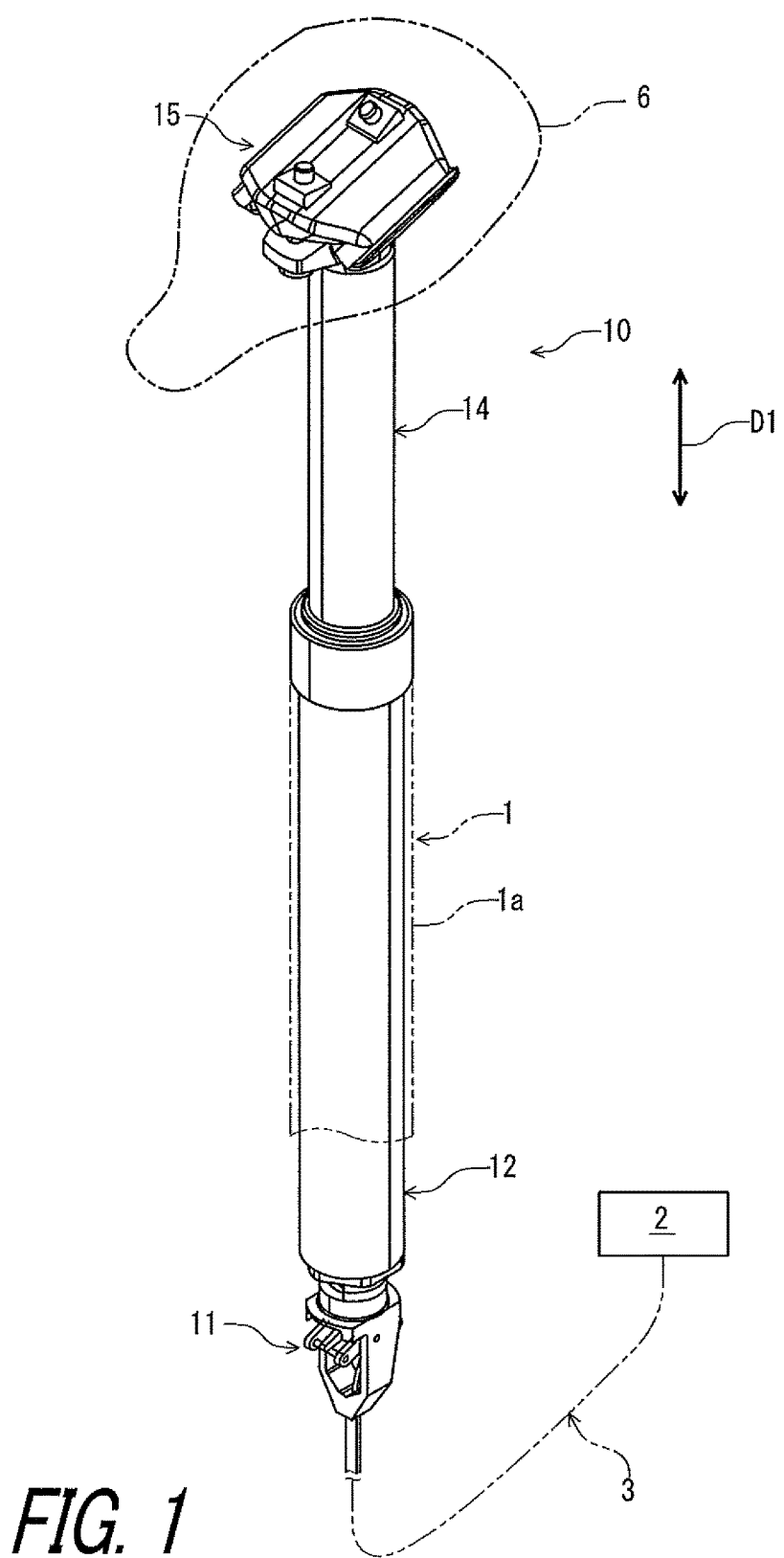
FIG. 1 is a perspective view of a bicycle seatpost assembly including a bicycle actuation structure in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle seatpost assembly 10 comprises a bicycle actuation structure 11 in accordance with a first embodiment. The bicycle seatpost assembly 10 is to be attached to a bicycle frame 1. The bicycle seatpost assembly 10 comprises a first tube 12 and a second tube 14. The second tube 14 is configured to be telescopically received in the first tube 12 in a telescopic direction D1. The first tube 12 and the second tube 14 are configured to be movable relative to each other. The first tube 12 is detachably attached to a seat tube 1a of the bicycle frame 1. The bicycle seatpost assembly 10 comprises a mounting structure 15 configured to fixedly mount a bicycle seat 6 to the second tube 14. The bicycle seat 6 is, for example, a saddle.

Figure 2:
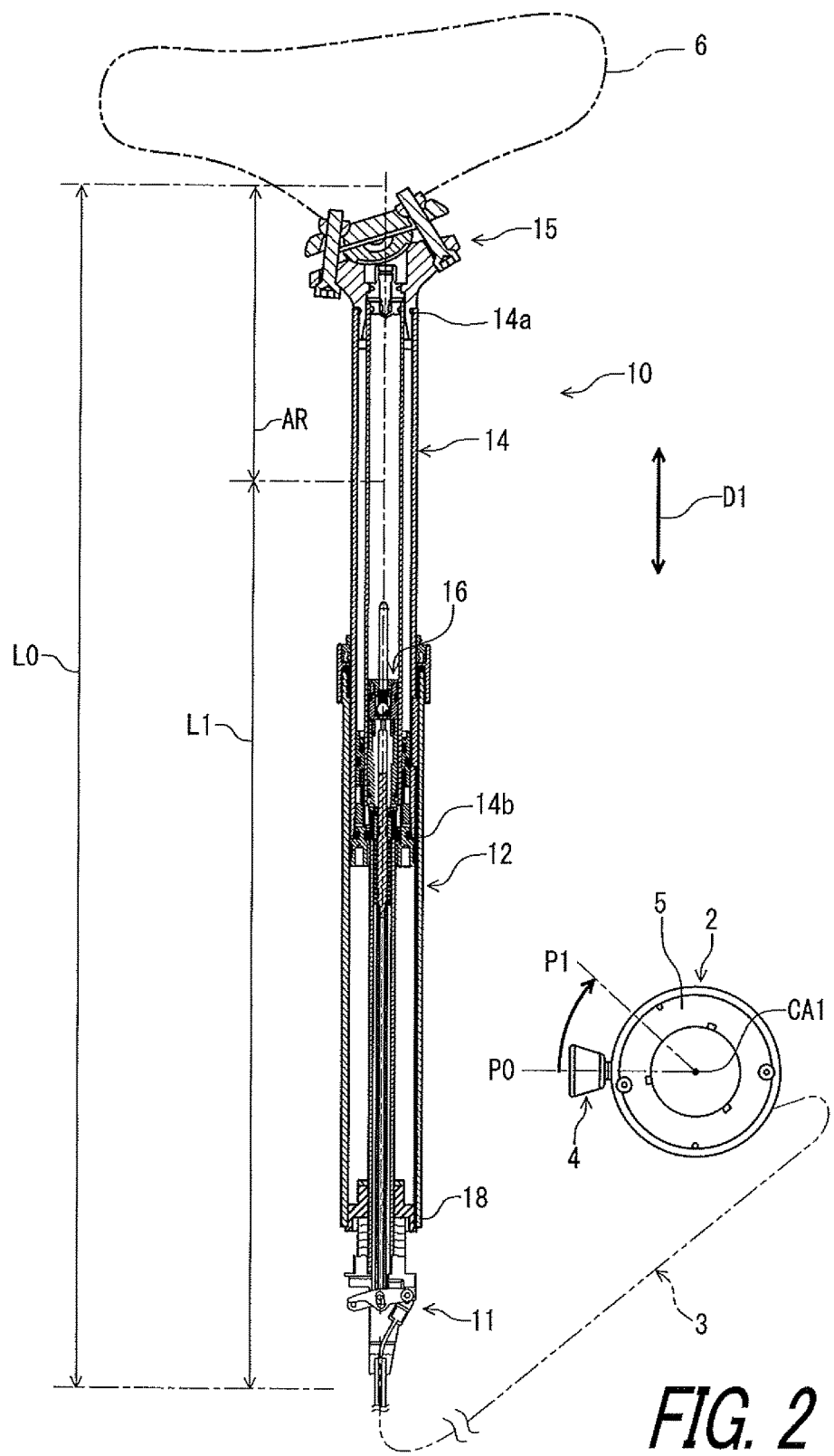
FIG. 2 is a cross-sectional view of the bicycle seatpost assembly illustrated in FIG. 1.

As seen in FIG. 2, the second tube 14 has a distal end 14a to be attached to the bicycle seat 6 and a proximal end 14b opposite to the distal end 14a. The distal end 14a is an uppermost portion of the second tube 14 in a state where the bicycle seatpost assembly 10 is mounted to the bicycle frame 1 that is in an upright position. The proximal end 14b is a lowermost portion of the second tube 14 in a state where the bicycle seatpost assembly 10 is mounted to the bicycle frame 1 that is in an upright position. The mounting structure 15 is attached to the distal end 14a of the second tube 14. Further, the bicycle seatpost assembly 10 comprises a positioning structure 16. The positioning structure 16 is configured to position the first tube 12 and the second tube 14 relative to each other. The positioning structure 16 is configured to be operated via an operating device 2. For example, the operating device 2 is mounted on a bicycle handlebar (not shown). The bicycle actuation structure 11 is configured to actuate the positioning structure 16 in response to operation of the operating device 2. The bicycle actuation structure 11 is provided at a lower end 18 of the first tube 12 in a state where the bicycle seatpost assembly 10 is mounted to the bicycle frame 1 that is in an upright position. The bicycle actuation structure 11 can be provided at other positions in or outside the bicycle seatpost assembly 10. The bicycle actuation structure 11 is operatively coupled to an operating device 2 via a control cable 3 such as a Bowden cable. The bicycle actuation structure 11 is attached to the first tube 12 to transmit an operation force (e.g., pulling force) applied from the operating device 2 via the control cable 3.

In the present application, the following directional terms "forward", "rearward", "left", "right", "upward" and "downward" as well as any other similar directional terms refer to those directions which are determined on the basis of a rider who sits on the bicycle seat 6 of a bicycle with facing a bicycle handlebar (not shown). Accordingly, these terms, as utilized to describe the bicycle seatpost assembly 10, should be interpreted relative to a bicycle equipped with the bicycle seatpost assembly 10 as used in an upright riding position on a horizontal surface.

As seen in FIG. 2, the operating device 2 is configured to output an adjusting operation. More specifically, the operating device 2 includes an operated member 4 and a base member 5. The operated member 4 is configured to be pivotable relative to the base member 5 from a rest position P0 to an operated position P1 about a pivot axis CA1. Each of the rest position P0 and the operated position P1 is defined based on the pivot axis CA1 of the operated member 4. The control cable 3 is pulled by a first amount of operation when the operated member 4 is pivoted relative to the base member 5 from the rest position P0 to the operated position P1.

The bicycle seatpost assembly 10 has a maximum overall length L0 and a minimum overall length L1. The overall length of the bicycle seatpost assembly 10 is adjustable within an adjustable range AR defined as a difference between the maximum overall length L0 and the minimum overall length L1.

The positioning structure 16 has a locked state and an adjustable state. The positioning structure 16 changes a state of the bicycle seatpost assembly 10 between the locked state and the adjustable state. In the locked state, the second tube 14 is positioned relative to the first tube 12 in the telescopic direction D1. Specifically, in the locked state, the overall length of the bicycle seatpost assembly 10 is maintained at an adjusted overall length. In the locked state, the first tube 12 and the second tube 14 are fixedly positioned relative to each other in the telescopic direction D1.

In the adjustable state, a position of the second tube 14 is adjustable relative to the first tube 12 in the telescopic direction D1. In the adjustable state, the overall length of the bicycle seatpost assembly 10 is continuously adjustable within the adjustable range AR by operating the operated member 4 to the operated position P1. Namely, in the adjustable state, the positional relationship between the first tube 12 and the second tube 14 is continuously adjustable within the adjustable range AR.

The adjustable state of the bicycle seatpost assembly 10 is not limited to this embodiment. The total length of the bicycle seatpost assembly 10 can be stepwise adjusted in the adjustable state. For example, the total length of the bicycle seatpost assembly 10 can be stepwise adjusted at each of different lengths.

Figure 3:
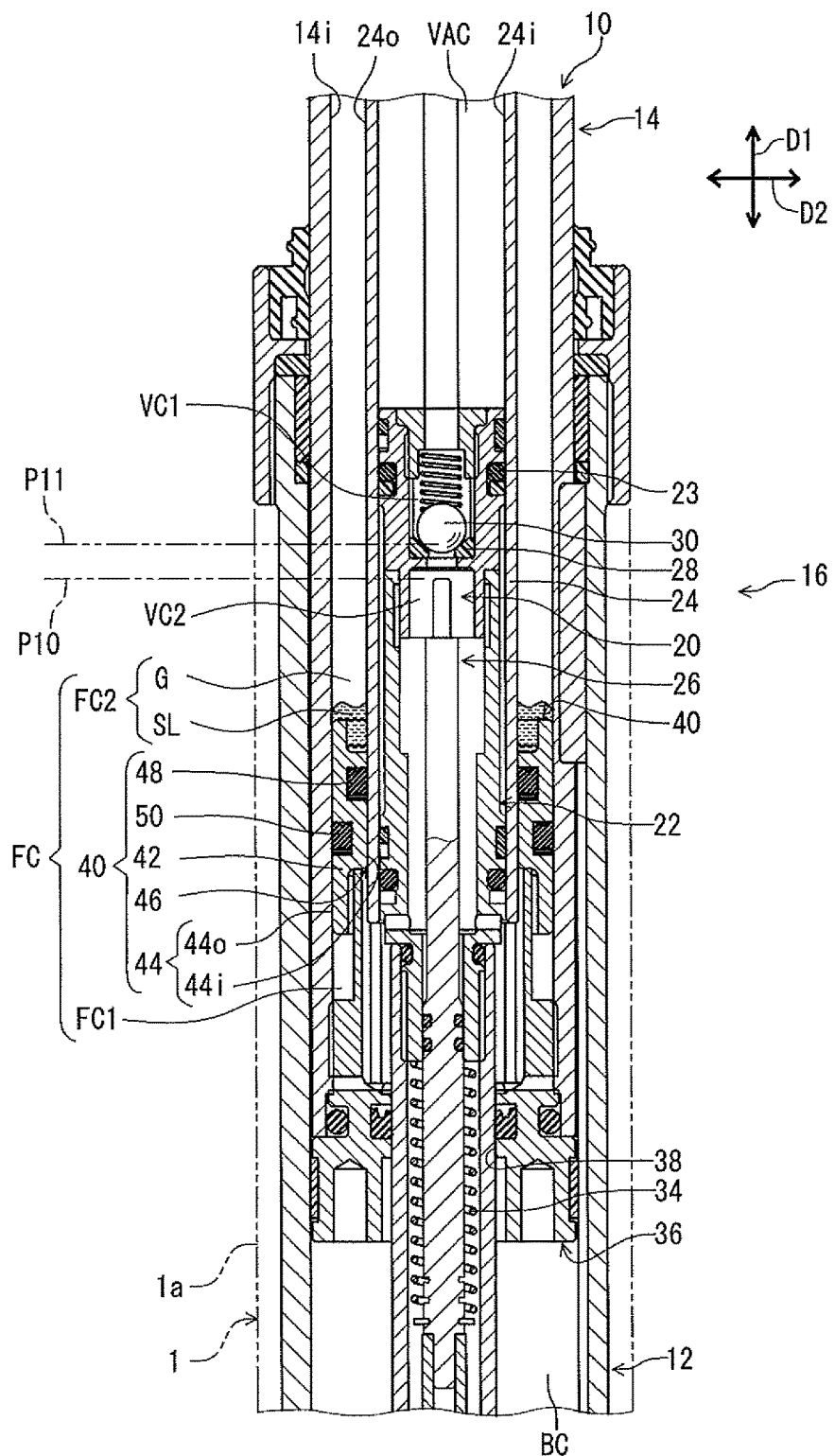
FIG. 3 is a partial cross-sectional view of the bicycle seatpost assembly illustrated in FIG. 1 (a closed position).

As seen in FIG. 3, the positioning structure 16 includes a hydraulic valve 20 to change the state of the bicycle seatpost assembly 10 between the locked state and the adjustable state. In this embodiment, the hydraulic valve 20 changes the state of the positioning structure 16 among the locked state and the adjustable state in response to the operation of the operating device 2.

The positioning structure 16 includes a support member 22, an inner tube 24, and a movable rod 26. A lower end of the support member 22 is secured to the first tube 12. The support member 22 is integrated with the first tube 12. The support member 22 is movable integrally with the first tube 12 relative to the second tube 14 in the telescopic direction D1. An upper end of the inner tube 24 is secured to the second tube 14. The inner tube 24 is integrated with the second tube 14. The inner tube 24 is movable integrally with the second tube 14 relative to the first tube 12 in the telescopic direction D1. The support member 22 is provided in the inner tube 24. The movable rod 26 is provided in the support member 22.

As seen in FIG. 3, the support member 22 includes a first valve chamber VC1, a second valve chamber VC2, and a third valve chamber VC3. The second valve chamber VC2 is provided between the first valve chamber VC1 and the third valve chamber VC3 in the telescopic direction D1.

The positioning structure 16 includes a first seal member 28 and a valve member 30. The positioning structure 16 has a closed state (FIG. 4) and an open state (FIG. 5). The closed state corresponds to the locked state of the bicycle seatpost assembly 10. The open state corresponds to the adjustable state of the bicycle seatpost assembly 10.

The movable rod 26 is movable relative to the support member 22 and the first tube 12 in the telescopic direction D1 between a closed position P10 and an open position P11. In the closed state (FIG. 4) of the positioning structure 16, the movable rod 26 is positioned at the closed position P10. In the open state (FIG. 5) of the positioning structure 16, the movable rod 26 is positioned at the open position P11.

The positioning structure 16 includes a biasing element 34 to bias the movable rod 26 relative to the support member 22 toward the closed position P10. The position of the movable rod 26 is continuously adjustable relative to the support member 22 between the closed position P10 and the open position P11 using the operating device 2 (FIG. 2). When the operated member 4 is positioned at the rest position P0, the bicycle actuation structure 11 does not transmit the operation force applied from the operating device 2, thereby the movable rod 26 is positioned at the closed position P10 by a biasing force of the biasing element 34. When the operated member 4 is positioned at the operated position P1, the bicycle actuation structure 11 transmits the operation force applied from the operating device 2 to move the movable rod 26 from the closed position P10 to the open position P11 relative to the support member 22 against a biasing force of the biasing element 34.

As seen in FIG. 3, the positioning structure 16 includes a sealing structure 36 having an annular shape. The sealing structure 36 is secured to a lower end of the second tube 14. The sealing structure 36 includes a guide hole 38 extending in the telescopic direction D1. The support member 22 extends through the guide hole 38 of the sealing structure 36 in the telescopic direction D1.

As seen in FIG. 3, the positioning structure 16 includes a base chamber BC and a volume adjustable fluid chamber VAC. The base chamber BC is defined by the first tube 12, the support member 22, and the sealing structure 36. The base chamber BC is in communication with an outside of the bicycle seatpost assembly 10, for example. The volume adjustable fluid chamber VAC is defined by the support member 22, the inner tube 24, and the mounting structure 15. The volume adjustable fluid chamber VAC is filled with a first liquid. The first liquid is a substantially incompressible fluid such as an oil. The first liquid has a first viscosity. The support member 22 includes a second seal member 23 to prevent the first liquid from leaking out of the volume adjustable fluid chamber VAC via a gap between the support member 22 and the inner tube 24.

The positioning structure 16 comprises a fluid chamber FC. The fluid chamber is provided in the second tube 14. The fluid chamber FC is defined by the second tube 14, the inner tube 24, the sealing structure 36, and the mounting structure 15 (FIG. 2). The fluid chamber FC comprises a first chamber FC1, a second chamber FC2, and a movable piston 40. The movable piston 40 divides the fluid chamber FC into the first chamber FC1 and the second chamber FC2.

The first chamber FC1 is defined by the second tube 14, the inner tube 24, the sealing structure 36, and the movable piston 40. The first chamber FC1 is filled with the first liquid. The second chamber FC2 is defined by the second tube 14, the inner tube 24, the movable piston 40, and the mounting structure 15 (FIG. 2). The first chamber FC1 and the second chamber FC2 are aligned in the telescopic direction D1. In other words, the first chamber FC1 and the second chamber FC2 are at least partly overlapping with each other as viewed from the telescopic direction D1. However, the first chamber FC1 and the second chamber FC2 may be offset from each other as viewed from the telescopic direction D1. The second chamber FC2 is disposed closer to the distal end 14a of the second tube 14 than the first chamber FC1.

The second chamber FC2 includes a second liquid SL and gas G. The gas G is a compressible fluid. The gas G may be air or gas other than air. The second liquid SL is provided to be closer to the movable piston 40 than the gas G in a state where the first tube 12 is mounted to the bicycle frame 1 that is in an upright position. The second liquid SL is a substantially incompressible fluid. The second liquid SL may be the same as the first liquid, but is preferably different from the first liquid. The second liquid may include an oil. Preferably, the second liquid has a second viscosity that is larger than the first viscosity. More preferably, the second liquid has a kinematic viscosity more than or equal to 300 centistokes (300 mm$^2$/s) at 40 degrees Celsius. The second liquid has a kinematic viscosity less than or equal to 1000 centistokes (1000 mm$^2$/s) at 40 degrees Celsius. Even more preferably, the second liquid has a kinematic viscosity less than or equal to 400 centistokes (400 mm$^2$/s) at 40 degrees Celsius. Even more preferably, the second liquid has a kinematic viscosity about 350 centistokes (350 mm$^2$/s) at 40 degrees Celsius.

A bulk density of the second liquid is preferably 0.886 g/cm$^3$, but a value of the bulk density is not limited to this embodiment. The bulk density may be a different value. Preferably, a volume of the second liquid SL in the second chamber FC2 is preferably an enough volume to cover a second chamber facing side 40u (FIGS. 4 and 5) of the movable piston 40 in a state where the first tube 12 is mounted to the bicycle frame 1 that is in an upright position. The second chamber facing side 40u means a surface facing the second chamber FC2. More preferably, the volume of the second liquid is more than or equal to 0.5 cc. The volume of the second liquid is less than or equal to 10 cc. Even more preferably, the volume of the second liquid is more than or equal to 1 cc. The volume of the second liquid is less than or equal to 3 cc. Even more preferably, the volume of the second liquid is about 1 cc.

The second chamber FC2 is configured to apply a biasing force to the movable piston 40 so that the second tube 14 moves relative to the first tube 12 in the telescopic direction D1. The compressible fluid is compressed in the second chamber FC2 in a state where the overall length of the bicycle seatpost assembly 10 is less than the maximum overall length L0 (FIG. 2).

The movable piston 40 comprises a movable member 42 having a circumference 44. The movable member 42 has an annular shape. That is, the circumference 44 includes an inner circumference 44i and an outer circumference 44o around and opposite to the inner circumference 44i with respect to a radial direction D2 perpendicular to the telescopic direction D1. The movable piston 40 includes a guide hole 46 defined by the inner circumference 44i. The guide hole 46 extends in the telescopic direction D1. The inner tube 24 extends through the guide hole 46 of the movable piston 40 in the telescopic direction D1. The movable piston 40 is movable within the fluid chamber FC. Specifically, the movable piston 40 is movable relative to the second tube 14 and the inner tube 24 in the telescopic direction D1 (a first direction D1). That is, the movable member 42 is movable in the first direction D1 in which the first chamber FC1 and the second chamber FC2 are aligned.

The entire volume of the fluid chamber FC is constant. So, the movable piston 40 is movable within the fluid chamber FC to change relationship of volume between the first chamber and the second chamber. In a case where the movable member 42 moves toward the distal end 14a of the second tube 14, a volume of the second chamber FC2 is decreased, thereby the gas G is compressed. In this case, the biasing force applied to the movable piston 40 toward the first chamber FC1 is increased. Conversely, in a case where the movable member 42 moves toward the sealing structure 36, a volume of the second chamber FC2 is increased, thereby the gas G is expanded. In this case, the biasing force applied to the movable piston 40 toward the first chamber FC1 is decreased.

The gas G in the second chamber FC2 has a first volume V1 in a state where the distal end 14a of the second tube 14 is positioned farthest from the first tube 12, i.e. the bicycle seatpost assembly 10 has the maximum overall length L0. The gas G in the second chamber FC2 has a second volume V2 in a state where the distal end 14a of the second tube 14 is positioned closest to the first tube 12, i.e. the bicycle seatpost assembly 10 has the minimum overall length L1. A compression ratio defined as the first volume V1 divided by the second volume V2 is less than or equal to 2.0. Preferably, the compression ratio is more than 1.0 and less than or equal to 1.5.

The movable piston 40 comprises a first seal 48. The first seal 48 is provided on the circumference 44 and contacts the fluid chamber FC to prevent the first liquid from leaking out of the first chamber FC1 to the second chamber FC2 and to prevent the second liquid SL and/or the gas G from leaking out of the second chamber FC2 to the first chamber FC1. Specifically, the first seal 48 is provided on the inner circumference 44i and contacts an outer peripheral surface 24o of the inner tube 24 to prevent the first liquid from leaking out of the first chamber FC1 to the second chamber FC2 via a gap between the inner circumference 44i and the outer peripheral surface 24o and to prevent the second liquid SL and/or the gas G from leaking out of the second chamber FC2 to the first chamber FC1 via a gap between the inner circumference 44i and the outer peripheral surface 24o. The first seal 48 is an elastic member having an annular shape.

The movable piston 40 further comprises a second seal 50. The second seal 50 is provided on the circumference 44 and contacts the fluid chamber FC to prevent the first liquid from leaking out of the first chamber FC1 to the second chamber FC2 and to prevent the second liquid SL and/or the gas G from leaking out of the second chamber FC2 to the first chamber FC1. Specifically, the second seal 50 is provided on the outer circumference 44o and contacts an inner peripheral surface 14i of the second tube 14 to prevent the first liquid from leaking out of the first chamber FC1 to the second chamber FC2 via a gap between the outer circumference 44o and the inner peripheral surface 14i and to prevent the second liquid SL and/or the gas G from leaking out of the second chamber FC2 to the first chamber FC1 via a gap between the outer circumference 44o and the inner peripheral surface 14i. The first seal 48 and the second seal 50 are disposed along the first direction D1. The second seal 50 is an elastic member having an annular shape.

Figure 4:
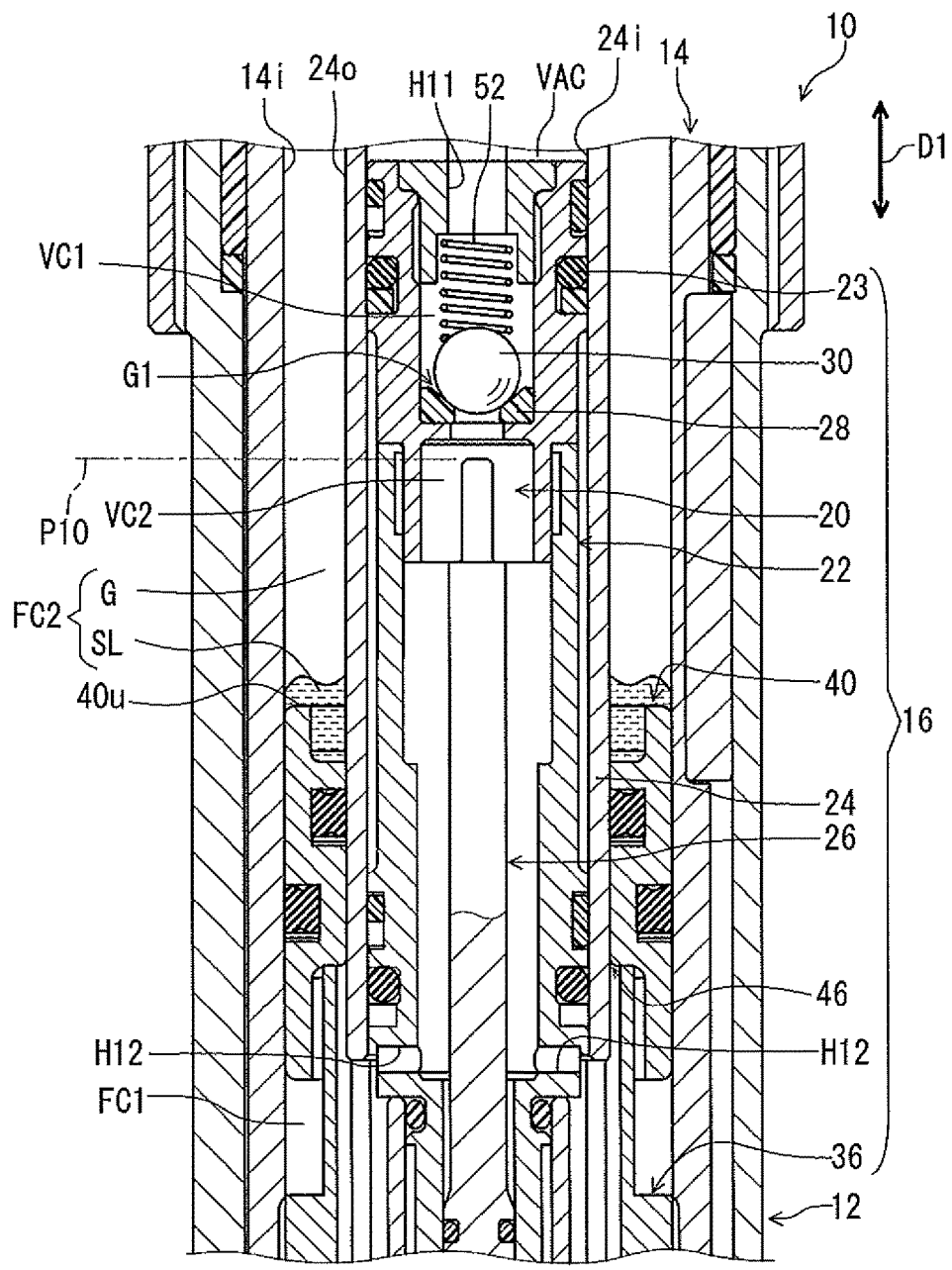
FIG. 4 is an enlarged partial cross-sectional view of the bicycle seatpost assembly illustrated in FIG. 1 (the closed position).
Figure 5:
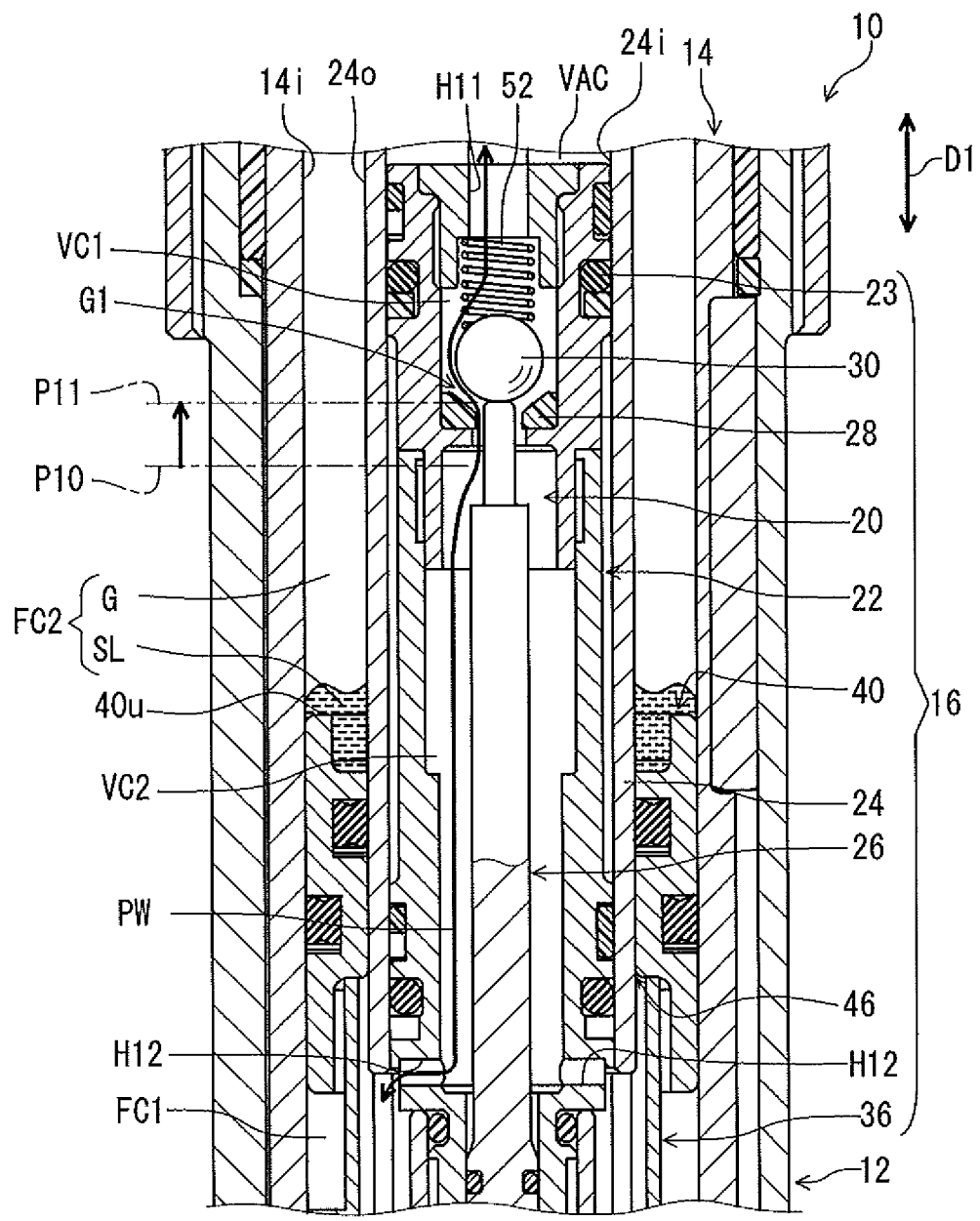
FIG. 5 is an enlarged partial cross-sectional view of the bicycle seatpost assembly illustrated in FIG. 1 (an open position).

As seen in FIG. 4, the positioning structure 16 includes a valve biasing member 52 to bias the valve member 30 against the first seal member 28. The movable rod 26 moves the valve member 30 relative to the first seal member 28 against a biasing force of the valve biasing member 52 to open a fluid gate G1. The valve member 30 is provided between the first seal member 28 and the valve biasing member 52 in the telescopic direction D1. The valve member 30 is provided between the movable rod 26 and the valve biasing member 52 in the telescopic direction D1. The valve biasing member 52 is provided in the first valve chamber VC1.

As seen in FIGS. 4 and 5, the valve member 30 provides the fluid gate G1 of a passageway PW together with the first seal member 28. The valve member 30 is contactable with the first seal member 28 to close the fluid gate G1. The movable rod 26 moves the valve member 30 relative to the first seal member 28 to open the fluid gate G1. The first valve chamber VC1 is in communication with the second valve chamber VC2 via the fluid gate G1 in a state where the fluid gate G1 is open.

When the movable rod 26 is positioned at the closed position P10, the valve member 30 is in contact with the first seal member 28 to close the fluid gate G1. When the movable rod 26 is positioned at the open position P11, the valve member 30 is spaced apart from the first seal member 28 to open the fluid gate G1.

As seen in FIG. 5, the passageway PW connects the volume adjustable fluid chamber VAC to the first chamber FC1. More specifically, the support member 22 includes a first through-hole H11 and second through-holes H12. The first through-hole H11 connects the volume adjustable fluid chamber VAC to the first valve chamber VC1. The second through-holes H12 connects the second valve chamber VC2 to the first chamber FC1. The passageway PW includes the first through-hole H11, the first and second valve chambers VC1 and VC2, and the second through-holes H12.

The operation of the bicycle seatpost assembly 10 will be described in detail below.

As seen in FIG. 4, the fluid gate G1 is closed in the locked state where the operated member 4 is positioned at the rest position P0. In the locked state, the second tube 14 is fixedly positioned relative to the first tube 12.

As seen in FIG. 5, the fluid gate G1 is open when the operated member 4 is moved from the rest position P0 to the operated position P1 to change from the locked state to the adjustable state. In this adjustable state, the volume adjustable fluid chamber VAC is connected to the first chamber FC1 via the passageway PW. The fluid flows between the volume adjustable fluid chamber VAC and the first chamber FC1 through the passageway PW.

In the adjustable state, the second tube 14 is retracted or extended relative to the first tube 12 in response to a reference force applied to the second tube 14. The reference force is, for example a force applied on the distal end 14a of the second tube 14 in a downward direction. The reference force may include, for example, a gravitational force of an average adult weight.

In a case where the biasing force of the second chamber FC2 is smaller than the reference force, the movable piston 40 moves toward the distal end 14a of the second tube 14 in the telescopic direction D1 to be positioned at a position where the reference force is equal to an increased biasing force of the second chamber FC2 caused by a compression of the gas G, thereby the second tube 14 is retracted relative to the first tube 12. In a case where the biasing force of the second chamber FC2 is larger than the reference force, the movable piston 40 moves toward the sealing structure 36 in the telescopic direction D1 to be positioned at a position where the reference force is equal to a decreased biasing force of the second chamber FC2 caused by an expansion of the gas G, thereby the second tube 14 is extended relative to the first tube 12. Since the movable piston 40 is movable as described above, the movable piston 40 is a floating piston. In other words, in a case where the first liquid has a first pressure and the gas has a second pressure, the movable piston is to be positioned such that the first pressure is equal to the second pressure.

The bicycle seatpost assembly 10 includes the following features.

(1) With the bicycle seatpost assembly 10, the positioning structure 16 is configured to position the first tube 12 and the second tube 14 relative to each other. The positioning structure 16 comprises a fluid chamber FC. The fluid chamber FC comprises the first chamber FC1, the second chamber FC2, and the movable piston 40. The first chamber FC1 is filled with the first liquid. The second chamber FC2 includes the second liquid SL and gas G. The movable piston 40 is movable within the fluid chamber FC. Accordingly, it is possible to reduce or prevent an intrusion of the gas G into the first chamber FC1. The first liquid and the second liquid SL are incompressible, whereas the gas G is compressible. Thus, in a case where a lot of gas G intrudes into the first chamber FC1, the bicycle seat 6 may become unstable even after the relative position of the first tube 12 and the second tube 14 is stabilized by the positioning structure 16. Accordingly, the bicycle seat 6 can be stable after the relative position of the first tube 12 and the second tube 14 is stabilized by the positioning structure 16. In addition, the second liquid SL enhances slidability of the movable piston 40. Accordingly, durability of the movable piston is enhanced.

(2) The second liquid SL is provided to be closer to the movable piston 40 than the gas G in a state where the first tube 12 is mounted to the bicycle frame 1 that is in an upright position. Accordingly, it is possible for the second liquid SL to obstruct a gap between the movable piston 40 and an inner wall of the fluid chamber FC (the inner peripheral surface 14i of the second tube 14 and the outer peripheral surface 24o of the inner tube 24) in a state where the first tube 12 is mounted to the bicycle frame 1 that is in an upright position. Accordingly, it is possible to further reduce or prevent an intrusion of the gas G into the first chamber FC1. Therefore, the bicycle seat 6 can be further stable after the relative position of the first tube 12 and the second tube 14 is stabilized by the positioning structure 16.

(3) The fluid chamber FC is provided in the second tube 14. Accordingly, it is possible to design the second tube 14 such that an outer diameter of the second tube 14 is larger and a maximum overall length of the bicycle seatpost assembly 10 is longer compared to a bicycle seatpost assembly in which a fluid chamber thereof is provided in the first tube thereof.

(4) The second liquid SL includes an oil. The oil does not freeze in a typical environment where the bicycle seatpost assembly 10 is used. In addition, the second liquid SL hardly rust material of the second tube 14.

(5) The first liquid has a first viscosity, and the second liquid SL has a second viscosity that is larger than the first viscosity. The second liquid SL tends not to leak out of the second chamber FC2 even when a pressure difference between the first chamber FC1 and the second chamber FC2 becomes large. Thus, it is possible for the second liquid SL to obstruct a gap between the movable piston 40 and an inner wall of the fluid chamber FC (the inner peripheral surface 14i of the second tube 14 and the outer peripheral surface 24o of the inner tube 24) for a long time. Accordingly, durability of the bicycle seatpost assembly 10 is enhanced.

(6) The second liquid SL has a kinematic viscosity more than or equal to 300 centistokes at 40 degrees Celsius. The second liquid SL has the kinematic viscosity enough not to leak out of the second chamber FC2 even when a pressure difference between the first chamber FC1 and the second chamber FC2 becomes large. Thus, it is possible for the second liquid SL to obstruct a gap between the movable piston 40 and an inner wall of the fluid chamber FC (the inner peripheral surface 14i of the second tube 14 and the outer peripheral surface 24o of the inner tube 24) for a further long time. Accordingly, durability of the bicycle seatpost assembly 10 is further enhanced.

(7) The second liquid SL has a kinematic viscosity less than or equal to 1000 centistokes at 40 degrees Celsius. The second liquid SL has the kinematic viscosity enough to stay at the bottom of the second chamber FC2 (on the second chamber facing side 40u of the movable piston 40) even when the movable piston 40 moves rapidly. Thus, it is possible for the second liquid SL to obstruct a gap between the movable piston 40 and an inner wall of the fluid chamber FC (the inner peripheral surface 14i of the second tube 14 and the outer peripheral surface 24o of the inner tube 24) for a long time. Accordingly, it is possible to further reduce or prevent an intrusion of the gas G into the first chamber FC1. Therefore, the bicycle seat 6 can be further stable after the relative position of the first tube 12 and the second tube 14 is stabilized by the positioning structure 16. In addition, the second liquid SL does not impede movement of the movable piston 40 while the positioning structure 16 is operated by a user. Accordingly, operability of the bicycle seatpost assembly 10 is enhanced.

(8) The second liquid SL has a kinematic viscosity less than or equal to 400 centistokes at 40 degrees Celsius. Accordingly, followability of the second liquid SL with respect to movement of the movable piston 40 is further enhanced. Thus, the movable piston 40 can move further smoothly while the positioning structure 16 is operated by a user. Therefore, operability of the bicycle seatpost assembly 10 is further enhanced. Further, in a case where a kinematic viscosity of the second liquid SL is from 300 centistokes to 400 centistokes at 40 degrees Celsius, the followability of the second liquid SL remains high in a long-term use as well as leakage of the second liquid SL out of the second chamber FC2 is prevented in a long-term use. Accordingly, durability of the bicycle seatpost assembly 10 is further enhanced.

(9) The gas G in the second chamber FC2 has a first volume V1 in a state where the distal end 14a of the second tube 14 is positioned farthest from the first tube 12. The gas G in the second chamber FC2 has a second volume V2 in a state where the distal end 14a of the second tube 14 is positioned closest to the first tube 12. A compression ratio defined as the first volume V1 divided by the second volume V2 is less than or equal to 2.0. Accordingly, a pressure in the second chamber FC2 cannot become extremely high enough for the second liquid SL to leak out of the second chamber FC2 when the gas G is most compressed. Accordingly, durability of the bicycle seatpost assembly 10 is further enhanced.

(10) Preferably, the compression ratio is more than 1.0 and less than or equal to 1.5. Accordingly, the second liquid SL is further prevented from leaking out of the second chamber FC2 when the gas G is most compressed, because a pressure in the second chamber FC2 when the gas G is most compressed becomes lower than a pressure in the second chamber FC2 having a compression ratio less than or equal to 2.0. Accordingly, durability of the bicycle seatpost assembly 10 is further enhanced.

(11) The movable piston 40 is a floating piston. Accordingly, a pressure in an oil chamber (the first chamber FC1) can be transmitted to an air chamber (the second chamber FC2) via the movable piston 40 to compress the air chamber. The movable piston can sealingly divide the oil chamber and the air chamber and change relationship of volume between the oil chamber and the air chamber.

(12) The movable piston comprises the movable member 42 and the first seal 48. The movable member 42 has the circumference 44. The first seal 48 is provided on the circumference 44 and contacts the fluid chamber FC. Accordingly, the first seal 48 prevents the second liquid SL further from leaking out of the second chamber FC2. Accordingly, durability of the bicycle seatpost assembly 10 is further enhanced.

(13) The first seal 48 is an elastic member having an annular shape. This means the first seal 48 is a commodity. Accordingly, manufacturing cost of the bicycle seatpost assembly 10 can be reduced.

(14) The movable piston 40 further comprises the second seal 50 provided on the circumference 44 and contacting the fluid chamber FC. The first seal 48 and the second seal 50 are disposed along the first direction D1. The first seal 48 and the second seal 50 further prevent the second liquid SL from leaking out of the second chamber FC2. Accordingly, durability of the bicycle seatpost assembly 10 is further enhanced.

(15) The bicycle seatpost assembly 10 is to be attached to the bicycle frame 1. Accordingly, the bicycle seatpost assembly 10 is useful for driving a bicycle, because a rider of the bicycle can raise or lower the bicycle seat 6 without pulling up or pushing down the bicycle seat 6 with the rider's hand. Accordingly, the operability of the bicycle is enhanced.

Second Embodiment

A bicycle seatpost assembly 210 in accordance with a second embodiment will be described below referring to FIG. 6. The bicycle seatpost assembly 210 has substantially the same structures as those of the bicycle seatpost assembly 10 except for the bicycle actuation structure 11. Thus, elements having substantially the same function as those in the first embodiment will be numbered the same here, and will not be described and/or illustrated again in detail here for the sake of brevity.

Figure 6:
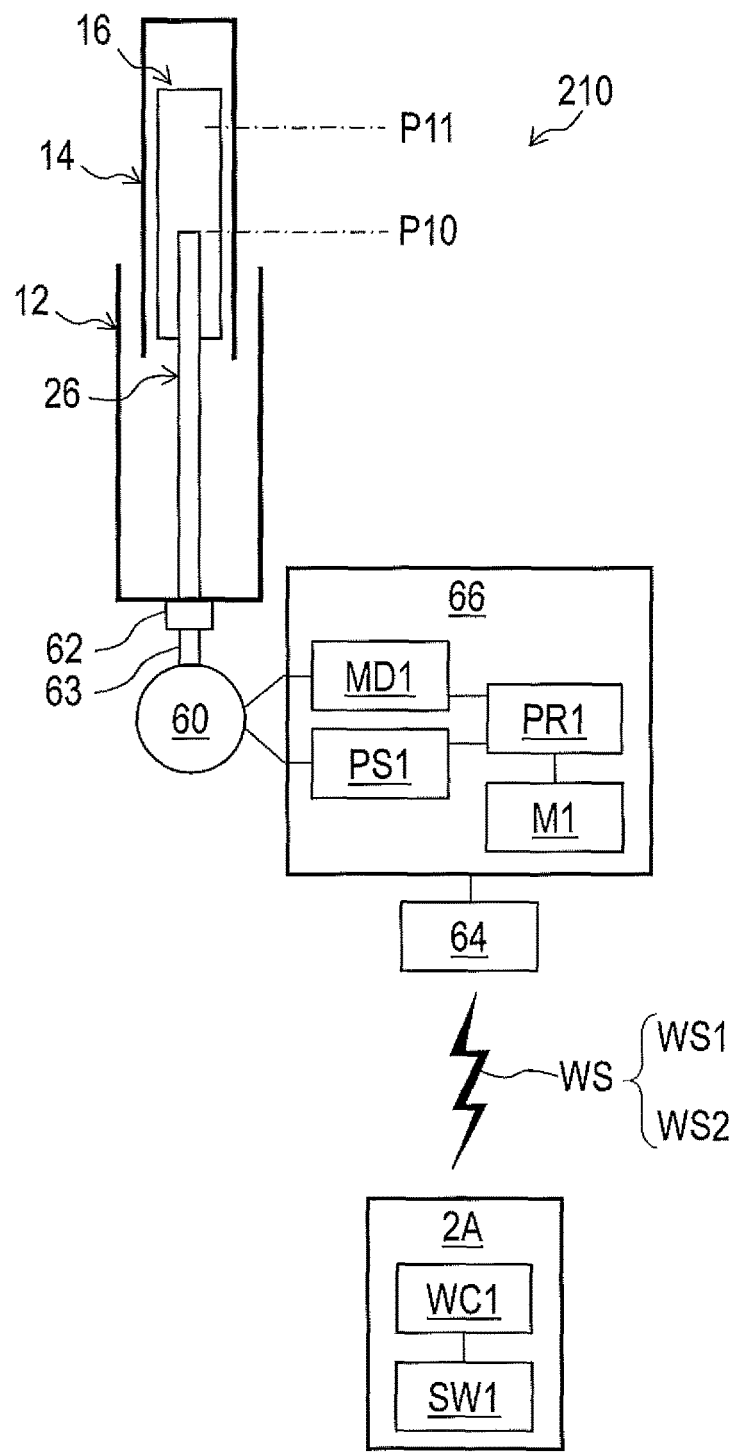
FIG. 6 is a schematic block diagram of a bicycle seatpost assembly in accordance with a second embodiment.

As seen in FIG. 6, the bicycle seatpost assembly 210 further comprises a motor 60 to move the movable rod 26 relative to the second tube 14 in the telescopic direction D1. The bicycle actuation structure 11 is omitted from the bicycle seatpost assembly 210. The movable rod 26 is operatively coupled to the motor 60. In this embodiment, the motor 60 changes the state of the bicycle seatpost assembly 210 among the locked state and the adjustable state. The motor 60 moves the movable rod 26 relative to the first tube 12 in the telescopic direction D1 between the closed position P10 and the open position P11.

The bicycle seatpost assembly 210 further comprises a speed reducer 62 to convert rotation of a rotor 63 of the motor 60 into linear motion of the movable rod 26. The rotor 63 of the motor 60 is coupled to the movable rod 26 via the speed reducer 62.

The bicycle seatpost assembly 210 further comprises a wireless communication device 64 to receive a wireless signal WS. The bicycle seatpost assembly 210 further comprises a motor controller 66 to control the motor 60 in response to the wireless signal WS.

The motor controller 66 is electrically connected to the motor 60 and the wireless communication device 64. The motor controller 66 controls the motor 60 to move the movable rod 26 relative to the first tube 12 in the telescopic direction D1 in response to the wireless signal WS.

The motor controller 66 includes a processor PR1, a memory M1, a position sensor PS1, and a motor driver MD1. The processor PR1 is electrically connected to the memory M1. The processor PR1 includes a central processing unit (CPU). The memory M1 stores programs and other information. The memory M1 includes a read only memory (ROM), a random access memory (RAM), and a memory controller. For example, a program stored in the memory M1 is read into the processor PR1, and thereby several functions of the motor controller 66 are performed.

To determine a current state of the positioning structure 16, the position sensor PS1 senses a current position of the movable rod 26 relative to the first tube 12 via the motor 60. Examples of the position sensor PS1 include a contact rotational position sensor such as a potentiometer, and a non-contact rotational position sensor such as an optical sensor (e.g., a rotary encoder) and a magnetic sensor (e.g., a hall sensor). The current position of the motor 60 is stored in the memory M1. The processor PR1 generates a control signal based on a signal of the switch SW1 and the current position of the motor 60.

The motor driver MD1 controls the motor 60 based on the control signal generated by the processor PR1. In this embodiment, the motor driver MD1 controls a rotational direction and/or a rotational speed of an output shaft of the motor 60 based on the control signal generated by the processor PR1.

An operating device 2A includes a switch SW1 and an additional wireless communication device WC1. In this embodiment, the switch SW1 includes a two-position switch having two positions corresponding to the closed position P10 and the open position P11 of the movable rod 26. The wireless communication device WC1 generates the wireless signal WS based on operation of the switch SW1. The wireless communication device WC1 generates a first position signal WS1 and a second position signal WS2 based on an operated position of the switch SW1. The first position signal WS1 corresponds to the closed position P10. The second position signal WS2 corresponds to the open position P11. The wireless communication device WC1 wirelessly transmits the first position signal WS1 and the second position signal WS2 as the wireless signal WS.

The wireless communication device 64 wirelessly receives the first position signal WS1 and the second position signal WS2 as the wireless signal WS. The motor controller 66 controls the motor 60 to position the movable rod 26 at the closed position P10 in response to the first position signal WS1. The motor controller 66 controls the motor 60 to position the movable rod 26 at the open position P11 in response to the second position signal WS2.

The wireless communication device 64 can be omitted from the bicycle seatpost assembly 210. In such an embodiment, the motor controller 66 is electrically connected to the operating device 2A via an electric control cable.

With the bicycle seatpost assembly 210, it is possible to obtain substantially the same effects as those of the bicycle seatpost assembly 10 in accordance with the first embodiment.

Furthermore, the bicycle seatpost assembly 210 includes the following features.

(1) The bicycle seatpost assembly 210 further comprises the motor 60 to move the movable rod 26 relative to the second tube 14 in the telescopic direction D1. Accordingly, it is possible to change the state of the bicycle seatpost assembly 210 using electric power.

(2) The bicycle seatpost assembly 210 further comprises the wireless communication device 64 to receive the wireless signal WS, and the motor controller 66 to control the motor 60 in response to the wireless signal WS. Accordingly, it is possible to change the state of the bicycle seatpost assembly 210 using wireless technology.

It will be apparent to those skilled in the bicycle field from the present disclosure that the structures and/or configurations of the above embodiments can be at least partly combined with each other.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle seatpost assembly comprising:
a first tube;
a second tube having a distal end to be attached to a bicycle seat and a proximal end opposite to the distal end, the second tube being configured to be telescopically received in the first tube; and
a positioning structure configured to position the first tube and the second tube relative to each other, the positioning structure comprising:
a fluid chamber comprising:
a first chamber filled with a first liquid, the first chamber being connected to a passageway connecting the first chamber to an additional fluid chamber provided in the first tube or the second tube, the passageway having a fluid gate to be opened such that the first liquid flows between the first chamber and the additional fluid chamber;
a second chamber including a second liquid and a gas, the second chamber being disposed closer to the distal end of the second tube than the first chamber; and
a movable piston provided between the first chamber and the second chamber to sealingly divide the fluid chamber into the first chamber and the second chamber, a portion of the passageway extending through the movable piston such that when the fluid gate is opened a relationship of volume between the first chamber and the second chamber is changeable, the movable piston being a floating piston movable within the fluid chamber.

2. The bicycle seatpost assembly according to claim 1, wherein
the second chamber is arranged in relation to the movable position such that the second liquid is provided to be closer to the movable piston than the gas due to gravitational forces in a state where the first tube is mounted to a bicycle frame that is in an upright position and where the second tube is stationary with respect to the first tube.

3. The bicycle seatpost assembly according to claim 2, wherein
the fluid chamber is provided in the second tube.

4. The bicycle seatpost assembly according to claim 1, wherein
the fluid chamber is provided in the second tube.

5. The bicycle seatpost assembly according to claim 1, wherein
the bicycle seatpost assembly is to be attached to a bicycle frame.

6. The bicycle seatpost assembly according to claim 1, wherein
the second liquid includes an oil.

7. The bicycle seatpost assembly according to claim 6, wherein
the second liquid has a kinematic viscosity more than or equal to 300 centistokes at 40 degrees Celsius.

8. The bicycle seatpost assembly according to claim 7, wherein
the second liquid has a kinematic viscosity less than or equal to 1000 centistokes at 40 degrees Celsius.

9. The bicycle seatpost assembly according to claim 8, wherein
the second liquid has a kinematic viscosity less than or equal to 400 centistokes at 40 degrees Celsius.

10. The bicycle seatpost assembly according to claim 1, wherein
the first liquid has a first viscosity, and
the second liquid has a second viscosity that is larger than the first viscosity.

11. The bicycle seatpost assembly according to claim 6, wherein
the gas in the second chamber has a first volume in a state where the distal end of the second tube is positioned farthest from the first tube,
the gas in the second chamber has a second volume in a state where the distal end of the second tube is positioned closest to the first tube, and
a compression ratio defined as the first volume divided by the second volume is less than or equal to 2.0.

12. The bicycle seatpost assembly according to claim 11, wherein
the compression ratio is more than 1.0 and less than or equal to 1.5.

13. The bicycle seatpost assembly according to claim 1, wherein the movable piston comprises a movable member having a circumference and a first seal provided on the circumference and contacting the fluid chamber.

14. The bicycle seatpost assembly according to claim 13, wherein the first seal is an elastic member having an annular shape.

15. The bicycle seatpost assembly according to claim 13, wherein the movable member is movable in a first direction in which the first chamber and the second chamber are aligned, the movable piston further comprises a second seal provided on the circumference and contacting the fluid chamber, and the first seal and the second seal are disposed along the first direction.

* * * * *